Patented Apr. 8, 1952

2,592,446

UNITED STATES PATENT OFFICE 2,592,446

MODIFICATION OF SYNTHETIC ALPHA-AMINO ACID POLYMERS BY MEANS OF N-SUBSTITUTED ALPHA-AMINO ACID N-CARBOANHYDRIDES

Robert Neal MacDonald, New Castle, Del., assignor to E. I. du Pont de Nemours and Company, Wilmington, Del., a corporation of Delaware No Drawing. Application February 24, 1949,
Serial No. 78,223

13 Claims. (Cl. 260—42)

This invention relates to amino acid polymers.

As disclosed in the copending applications of MacDonald, Serial Nos. 766,457 (now Patent Number 2,572,844) and 766,458 (now Patent Number 2,572,843), filed August 5, 1947, and Serial No. 778,459 (now Patent Number 2,572,842), filed October 7, 1947, and of Winberg, Serial No. 778,453, filed October 7, 1947, film- and fiber-forming polyamides can be prepared by polymerizing, with carbon dioxide evolution, the N-carboanhydrides of amino acids.

Although these polyamides are of high molecular weight and orientable, have good thermal stability, and exhibit good strengths both wet and dry, properties much desired in film- and fiber-forming materials, they are deficient in water sensitivity and dyeability, i. e., relative ease of water absorption and power of retention of dyestuffs. For maximum commercial utility, it is imperative that a film- or fiber-forming material be well and easily dyed with a variety of dyes. Similarly, for conversion of said fibers to fabrics, involving as it does sizing, weaving, etc., some water sensitivity is necessary, if the material is to be handled on equipment presently installed.

This invention has as an object the treatment of already formed synthetic, film- and fiber-forming, alpha-amino acid polymers to improve their water sensitivity and increase their dyeability. A further object is the provision of alpha-amino acid polymers of greater ease of water absorption and increased retentive power for dyestuffs. Another object is the provision of polymers which in fiber form are more readily handled in conventional textile equipment. Other objects will appear hereinafter.

These objects are accomplished by the following invention wherein already formed, orientable, synthetic, film- and fiber-forming polymers from alpha-amino acids having primary amino groups are modified by reacting with N-substituted-alpha-amino acid N-carboanhydrides at 25–160° C. for 15 minutes to 48 hours.

In the preferred practice of this invention the preformed alpha-amino acid polymers are reacted with N-substituted-alpha-amino acid N-carboanhydrides, preferably the N-carboanhydrides of alpha-amino acids of two to seven carbons carrying in addition from one to seven carbons on the amino nitrogen, for 4 to 24 hours at 50–150° C. It is believed that what occurs in the main is that the preformed alpha-amino acid polymer reacts through its terminal amine hydrogens with the N-substituted-alpha-amino acid N-carboanhydride causing scission of the N-carboanhydride ring with carbon dioxide evolution and lengthening of the polymer chain with an N-substituted-alpha-amino acid unit. The thus lengthened polymer chain can, in turn, react with more N-substituted-alpha-amino acid N-carboanhydride thus resulting in a modified alpha-amino acid polymer containing N-substituted-alpha-amino acid units. This reaction may be visualized as follows:

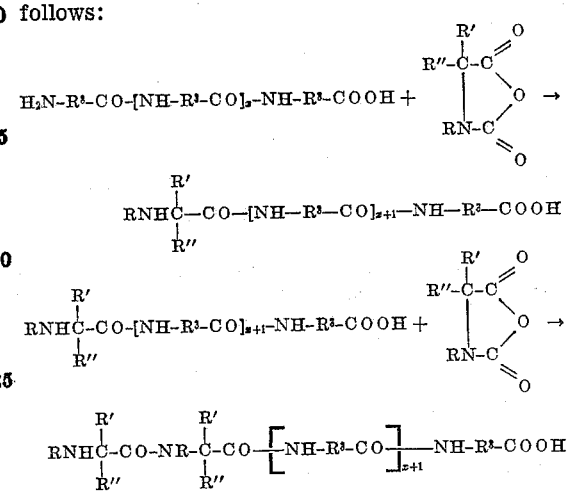

etc.

Inherent viscosity, $\eta_{inh.}$, as used in this specification is defined by the following expression:

$$\eta_{inh.} = \frac{ln\,\eta_{rel.}}{C}$$

wherein $ln$ represents the natural, or Napierian, logarithm, $$\eta_{rel.} = \frac{\eta_{solution}}{\eta_{solvent}}$$

$\eta$ is viscosity and C is concentration of the solute in grams per 100 cc. of solution. Specifically the inherent viscosities reported here were determined on 0.5 g. per 100 cc. solutions of the polyamide involved dissolved in meta-cresol at 25° C.

The following examples in which parts are by weight are illustrative of the invention.

EXAMPLE I

A 0.32 part sample of the copolyamide from a 2:1 by weight mixture of the N-carboanhydrides of L-leucine and 1-aminocyclohexanecarboxylic acid [prepared by polymerizing a 2:1 by weight mixture of the respective N-carboanhydrides at about 3% solids concentration in reagent grade benzene by heating at 65° C. for 120 hours in a reactor open to the atmosphere only through a capillary tube and finally isolating the copolyamide by evaporating the benzene] is dissolved in 17.58 parts of benzene at 65° C. and a solution of 0.15 part of the N-carboanhydride of sarcosine (N-methylglycine) in 4.395 parts of benzene is added. The resulting solution is heated at 65° C. for 19 hours in a system open to the atmosphere only through a small capillary. At the end of this time the solution is poured in a thin film onto a glass plate and the benzene is allowed to evaporate at room temperature. Upon removal from the casting surface, there is obtained a smooth, flexible, homogeneous, tough film of sarcosine-modified, L-leucine/1-aminocyclohexanecarboxylic acid copolymer, which shows a markedly increased receptivity for acid, acetate and direct dyes as contrasted to a film prepared similarly from another sample of the original unmodified copolyamide. Specific examples of the dyes tested and the methods of dyeing used are given below wherein the dyeings are carried out for 60 minutes at the boil on strips of film in a dye bath containing approximately 35% dye based on the polymer and diluted to approximately 1,000 to 1 based on the polymer.

*Blue acid dyestuff (of about 75% color content), Color Index No. 1076*

The dye bath used contains one part of a solution prepared by diluting 6.15 parts of concentrated phosphoric acid with 1000 parts of water, and five parts of a solution prepared by pasting 0.3 part of the above blue dyestuff powder in five parts of cold water, dissolving in 250 parts boiling water, adding three parts of sodium sulfate, and diluting with 745 parts of water.

*Red acid dyestuff (of about 80% color content), Color Index No. 430*

The dye bath used contains one part of a solution prepared by diluting 3.0 parts of glacial acetic acid with 1000 parts of water, and five parts of a solution prepared from 0.3 part of the above red dyestuff powder, three parts of sodium sulfate, and 1000 parts of water in the manner described in the previous section for the above blue dyestuff powder.

*Yellow direct dyestuff, Color Index No. 365*

The dye bath used contains one part of a solution prepared by dissolving 45 parts of sodium chloride and three parts of trisodium phosphate in 1000 parts of water, and five parts of a solution prepared by pasting 0.3 part of the above yellow dyestuff powder in five parts of cold water, dissolving in 250 parts of boiling water, and diluting with 745 parts of water.

*Red direct dyestuff (of about 55% color content), Color Index No. 278*

The dye bath used contains one part of a solution prepared by dissolving nine parts of sodium chloride in 1000 parts of water, and five parts of a solution prepared from 0.3 part of the above red direct dyestuff powder and 1000 parts of water as described above for the above yellow dyestuff powder.

*Blue dyestuff obtainable by the procedure of Example IX of U. S. Patent 2,050,704*

The dye bath used contains five parts of a solution prepared by thoroughly pasting 0.3 part of this blue dyestuff in three parts of 10% olive oil soap solution, dispersing the paste in 30 parts of water at 70–75° C., and diluting the resultant suspension with 967 parts of warm water. The dispersion is well shaken just prior to use.

*Red dyestuff obtainable by the procedure of the sole example in Swiss Patent 149,405*

The dye bath used is made up exactly as described immediately above using 0.3 part of this red dyestuff instead of the preceding blue dyestuff.

EXAMPLE II

A 1.24 part sample of synthetic, optically inactive polymeric alpha-aminoisocaproic acid, $\eta_{inh.}=0.44$ [prepared by polymerizing synthetic, optically inactive alpha-aminoisocaproic acid N-carboanhydride, at 10% solids concentration in reagent grade benzene by letting the benzene solution stand at room temperature for three days in a reactor open to the atmosphere only through a capillary tube, subsequently heating at 65° C. for 7 to 8 days, and finally isolating the homopolyamide by evaporating the benzene solvent] is dissolved in 40.1 parts of benzene (analytical reagent grade) by stirring under reflux for three hours. To 31.34 parts of this solution is added 0.42 part of the N-carboanhydride of sarcosine, i. e., the N-carboanhydride of N-methylaminoacetic acid, and the resulting mixture stirred at reflux temperature for seven days. The benzene is evaporated from the reaction mixture and a sample of the resulting, solid, sarcosine-modified synthetic alpha-aminoisocaproic acid polymer is dissolved in chloroform. This solution is poured in a thin layer onto a glass plate and the chloroform allowed to evaporate at room temperature. There is obtained (after removal from the casting surface) a smooth, tough, slightly hazy film of sarcosine-modified, synthetic, optically inactive, polymeric alpha-aminoisocaproic acid, exhibiting an $\eta_{inh.}$ of 0.49. A like film, but unmodified, is prepared similarly from another sample of the same batch of starting polyamide. This latter unmodified synthetic, optically inactive, polymeric alpha-aminoisocaproic acid control film evidences no solubility in boiling water, analyzes for 12.04% nitrogen vs. a theoretical calculated value of 12.38%, and exhibits poor dye receptivity when dyed under standard procedures, as given in Example I with the above blue dyestuff of U. S. Patent 2,050,704 and the above red dyestuff of Swiss Patent 149,405.

On the other hand, the sarcosine-modified, synthetic, polymeric alpha-aminoisocaproic acid film loses 2.3% of its weight on extraction with boiling water, analyzes for 13.15% nitrogen vs. a theoretical calculated value of 12.38% nitrogen for the starting material and 13.96% nitrogen (assuming all the sarcosine N-carboanhydride enters into the modification of the synthetic, polymeric alpha-aminoisocaproic acid) and exhibits good dyeability with both the above dyes. This sarcosine-modified polymeric alpha-aminoisocaproic acid also exhibits improved dyeability for acid dyes when a small amount of a carrier, i. e., a swelling agent for the polymer, such as phenol, m-cresol or xylene, is added to the dye bath. In contrast, the unmodified control film is not improved in receptivity for acid dyes when dyed in the presence of a carrier.

EXAMPLE III

In a reactor open to the atmosphere only through a capillary tube, three parts of the N-carboanhydride of 2 - amino-4,6,6-trimethylheptanoic acid[1] and 1.5 parts of the N-carboanhydride of DL-alanine are dissolved in 187 parts of xylene, 0.001 part of m-cresyl initiator (0.034 mole per cent based on the total N-carboanhydrides) is added and the mixture heated for ten days at 115° C. At the end of this time a 17.6 part aliquot of the solution is removed and placed in another reactor opened to the atmosphere only through a capillary tube, 0.14 part of the N-carboanhydride of sarcosine in 4.395 parts of benzene are added and the mixture heated for two days at 65° C. At the end of this time the solution is poured in a thin film onto a glass plate and the benzene and xylene mixture allowed to evaporate at room temperature. Upon removal from the casting surface, there is obtained a smooth, flexible, homogeneous, tough film of sarcosine-modified 2 - amino-4,6,6-trimethylheptanoic acid/DL-alanine copolymer. This product exhibits an increased receptivity for the acetate dyes the above blue dyestuff of U. S. Patent 2,050,704 and above red dyestuff of Swiss Patent 149,405, when dyed in accordance with directions given in Example I as contrasted to a film prepared similarly from another sample of the original unmodified copolyamide.

In the process of this invention there can be employed for the modification of preformed, synthetic, orientable film- and fiber-forming alpha-amino acid polymers, the N-carboanhydride of any N-organic-substituted alpha-aminocarboxylic acid which acid, less its nitrogen substituent, is of no more than seven carbons and has the two remaining valences of the nitrogen of the acid (those not bonded to the alpha-carbon) satisfied by hydrogen and a substituted or unsubstituted monovalent organic radical of one to seven carbons, i. e., an N-carboanhydride of the formula

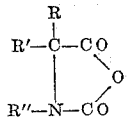

wherein R'' is an organic radical of one to seven carbons and together R and R' contain not more than five carbons and can both be hydrogen. The N-carboanhydrides of N-substituted-alpha-amino acids which, less the nitrogen substituent, contain more than seven carbons, i. e., whose acid skeleton is of more than seven carbons, or which have more than seven carbons in the substituent on nitrogen are of no utility in the process of this invention since they do not contribute water-sensitive properties to the polymers treated therewith and in many instances wherein the number of carbons in each of the two above-mentioned positions are appreciably more than seven the polymers after treatment therewith actually become less water-sensitive, i. e., more water-proof.

Especially preferred among the aliphatic, aromatic, heterocyclic, and cycloaliphatic N-substituted N-carboanhydrides of aliphatic, aromatic, cycloaliphatic and heterocyclic alpha-aminocarboxylic acids operable in the process of this invention for reasons of greater availability and ease of reaction in the modification procedure are the N-carboanhydrides of aliphatic and cycloaliphatic (i. e., aliphatic in character) alpha-amino acids of two to seven carbons carrying alkyl, aryl, alkaryl or cycloaliphatic nitrogen substituents of one to seven carbons wherein the substituents on the N-carboanhydride ring are solely hydrocarbon, i. e., 2,5-oxazolidinediones having a monovalent hydrocarbon radical, alkyl, aryl, alkaryl or cycloalkyl of no more than seven carbons on the annular nitrogen and having as substituents, if any, on the four carbon (i. e., the alpha-carbon of the amino acid) monovalent hydrocarbon radicals, hydrogen not being considered a substituent, and the total carbons in the said substituents being not more than five.

For reasons of improved water sensitivity and dyeability, I prefer to use those N-carboanhydrides of the above formula wherein R and R' are alkyl or hydrogen and total from one to four carbons and R'' is hydrocarbon of not more than seven carbons, i. e., N-hydrocarbon C-lower alkylglycines. Outstanding among these—due to their ease of preparation and greater reactivity with the preformed alpha-amino acid polymers to be modified—are those N-carboanhydrides of the above-type formula wherein R and R' are both hydrogen and R'' is solely hydrocarbon of no more than seven carbons, i. e., N-carboanhydrides of N-hydrocarbon glycines. The most outstanding of these due not only to their ease of preparation and greater reactivity with the preformed alpha-amino acid polymers to be modified, but also due to the especially improved water-sensitivity and dyeability conferred on the resulting modified polyamides, are those N-carboanhydrides of the above-type formula wherein R and R' are both hydrogen and R'' is lower alkyl (an alkyl radical containing from one to four carbons), i. e., the N-carboanhydrides of N-lower alkylglycines.

Among specific illustrative examples of the N-substituted-alpha-amino acids from which the above N-substituted alpha amino-acid N-carboanhydrides can be prepared, for instance by the methods given in the copending applications of MacDonald, Serial No. 778,458, filed October 7, 1947, and Prichard, Serial No. 52,971, filed October 5, 1948, there may be mentioned N-alkyl-substituted aliphatic alpha-amino acids, e. g., N-methyl-glycine, N-isopropylglycine, N-butylglycine, N-methyl-alanine, N-isopropylleucine, N-methyl - alpha - aminoiso - butyric acid; N-aryl-substiuted aliphtic alpha-amino acids, e. g., N-phenylglycine; N-cycloalkyl-substituted aliphatic alpha-amino acids, e. g., N-cyclohexylglycine; N-alkyl - substituted cycloaliphatic alpha - amino acids, e. g., N-methyl-1-aminocyclohexanecarboxylic acids; N-aryl-substituted cycloaliphatic alpha-amino acids, e. g., N-phenyl-1-aminocyclohexanecarboxylic acid; N-cycloalkyl-substituted cycloaliphatic alphaamino acids, e. g., N-cyclohexyl-1-aminocyclohexanecarboxylic acid.

The modification of the alpha-amino acid polymers can in theory be carried to any desired point, i. e., any amount of combined N-substituted-alpha-amino acid residues may be introduced into the polymer to be modified depending upon the degree of water sensitivity and improved dyeability desired. However, for retention to a major degree of the desirable fiber and film properties of the alpha-amino acid polymers being modified, it is necessary that the final modified product contain compositionally a major proportion, i. e., greater than 50%, of the original alpha-amino acid polymer being modified. Expressed another way this means that the final modified product corresponds compositionally to one containing less than 50% combined N-sub-

---

[1] This acid, its N-carboanhydride, and its polymers are described in detail in the copending application of MacDonald, Serial No. 778,459, filed October 7, 1947. As noted therein, this acid is a synthetic product and is a mixture of the DL, LL, LD, DD forms.

stituted-alpha-amino acid residues. However, since improvements in water sensitivity and dyeability of the order of magnitude necessary to make the alpha-amino acid polymers compare in these respects to other polymers can be engendered with relatively minor amounts of combined N-substituted amino acid residues in the end product and since such compositions maintain to the highest extent the favorable physical properties of the original alpha-amino acid polymers, it is desirable to carry out the modification under such conditions of temperature, time, and concentration of N-substituted-alpha-amino acid N-carboanhydride that only minor amounts, of the order of 1 to 25% and preferably in the lower end of this range, based on the final modified compositions, of N-substituted-alpha-amino acid residues are introduced into the alpha-amino acid polymer.

An increase in temperature accelerates the reaction but temperatures in excess of 160° C. are not recommended. Increased reaction time increases the amount of N-substituted-N-carboanhydride reacted, i. e., increases the modification at any given temperature up to the maximum obtainable with the N-carboanhydride present. Higher concentrations give higher degrees of modification for given times and temperature.

As previously pointed out synthetic, orientable, film- and fiber-forming polyamides and copolyamides from primary alpha-amino acids are deficient in dyeability, i. e., their ability to be dyed by a wide variety of different types of dyes. This is especially true of the synthetic polyamides and copolyamides of primary alpha-amino acids which apart from the amino and carboxyl groups are hydrocarbon. Among this latter group such a deficiency is most apparent in the polymers from alpha-primary amino alkanoic acids carrying no substituents. Among specific examples of such polymers may be mentioned the polyamides and copolyamides from the following primary alpha-amino alkanoic acids:

2-amino-4,6,6-trimethylheptanoic acid
DL-alpha-aminolauric acid
DL-alpha-aminomyristic acid
DL-alpha-aminocaprylic acid
DL-norleucine
DL-isoleucine
DL-valine
Alpha-aminoisobutyric acid
Alpha-aminodiethylacetic acid
Alpha-amino-alpha-methylbutyric acid
Alpha-amino-alpha,gamma-dimethylvaleric acid
Alpha-aminocyclohexylacetic acid
1-aminocyclohexanecarboxylic acid Among specific copolyamides that are deficient in dyeability there may be mentioned the copolyamides from the following mixtures of primary alpha-amino acids:

2-amino-4,6,6-trimethylheptanoic acid/alanine
Norleucine/alpha-aminoisobutyric acid
Norleucine/1-aminocyclohexanecarboxylic acid
Norleucine/2 - amino - 4,6,6 - trimethylheptanoic acid
Leucine/norleucine
Leucine/2-amino-4,6,6-trimethylheptanoic acid
Leucine/norvaline
Leucine/alpha-amino-n-butyric acid
2 - amino - 4,6,6 - trimethylheptanoic acid/alpha-aminoisobutyric acid
1 - aminocyclohexanecarboxylic acid/alpha-aminoalpha-methylbutyric acid
Leucine/phenylalanine Although all synthetic primary alpha-amino acid polyamides which are substituted only by hydrocarbon are deficient in dyeability and can be improved therein by the practice of this invention, the poor dyeability of the primary alpha-amino acid polyamides in the film- and fiber-forming ranges is most apparent since it is these type products that are normally dyed. Such film- and fiber-forming primary alpha-amino acid polyamides are usually the primary alpha-amino acid polyamides soluble in at least one of the solvents benzene, m-cresol, chloroform, and sulfuric acid, of degree of polymerization at least 25 and preferably in the range 60 to 100 or higher, and preferably of inherent viscosity 0.4 or higher, e. g., in the range 1.0–1.2 or even as high as 2.0.

A convenient method of preparing the alpha-amino acid polymers whose modification and improvement is made possible by this invention is to polymerize the N-carboanhydrides of the desired alpha-amino acids in solution, for instance, as disclosed in the copending applications of MacDonald Serial Nos. 778,031 and 778,032, filed October 4, 1947. MacDonald Serial No. 778,032 is now U. S. Patent 2,534,283. Modification of said alpha-amino acid polymers with N-substituted-alpha-amino acid N-carboanhydrides, as taught by this invention, can readily be carried out by dissolving the desired N-substituted-alpha-amino acid N-carboanhydride directly in the solution of alpha-amino acid polymer obtained from the polymerization and holding the resulting solution at such a temperature and for such a period of time as to cause the N-substituted-alpha-amino acid N-carboanhydride to react with the alpha-amino acid polymer, for instance, 4 to 24 hours at 50–150° C., preferably 65–100° C.

As illustrated by the examples, the alpha-amino acid polymers can be modified with the N-substituted-alpha-amino acid N-carboanhydrides by carrying out the modification reaction in solution. The modification may also be accomplished, especially if it is desired to prepare an only slightly modified alpha-amino acid polymer, i. e., one containing from 1 to 5% (based on the weight of the end composition) combined N-substituted-alpha-amino acid residues, by immersion of the alpha-amino acid polymer, preferably in thin film or fiber form, in a heated solution of the N-substituted-alpha-amino acid N-carboanhydride in a solvent or swelling agent for a short time. For instance, the polymer may be immersed in a chlorobenzene solution of the N-substituted-alpha-amino acid N-carboanhydride for 1–6 hours at 65-100° C.

Another method of carrying out the modification consists of mixing the preformed alpha-amino acid polymer, preferably in relatively finely divided form, with the desired N-substituted-alpha-amino acid N-carboanhydride and heating the resultant dry mixture until the desired modification takes place, for example, 15 minutes to 4 hours at 65° C. to 160° C. Modification may also be carried out (again especially if it is desired to prepare an only slightly modified alpha-amino acid polymer) by immersing the alpha-amino acid polymer, preferably in thin film or fiber form, directly in the desired N-substituted-alpha-amino acid N-carboanhydride in molten form for a short time and maintaining the alpha-amino acid polymer in the molten N-carboanhydride until the desired degree of modification has occurred. To prevent the polymerization of the N-substituted-alpha-amino acid N-carboanhydride, before the alpha-amino acid polymer to be modified is added, it is preferred to carry out the melting of the N-carboanhydride just prior to, or at the time of, the introduction of the alpha-amino acid polymer to be modified.

The N-substituted-alpha-amino acid N-carboanhydrides may be applied to the preformed alpha-amino acid polymer by any suitable means, examples of which are given above, wherein the added N-substituted-alpha-amino acid N-carboanhydride is maintained in contact with the polymer to be modified for a sufficient time at such a temperature that the N-carboanhydride reacts. For all practical purposes, since all known N-substituted-alpha-amino acid N-carboanhydrides are solids, it is most convenient, and therefore accordingly preferred, to dissolve the desired amount (calculated on the basis of the per cent combined N-substituted-alpha-amino acid residues it is desired to incorporate into the end product) of the N-substituted-alpha-amino acid N-carboanhydride involved in a suitable liquid which is a solvent for and non-reactive with both the N-carboanhydride and the polymer to be modified and to maintain the reaction mixture at such a temperature and for such a period of time that the N-substituted-alpha-amino acid N-carboanhydride all reacts, for instance, using chlorobenzene as the solvent for 24 hours at reflux. It is not necessary, however, as previously mentioned, in those instances where only a small amount of modification is desired, that all the N-substituted-alpha-amino acid N-carboanhydride present be reacted. This is especially true in those instances where the modification reaction is carried out on preformed thin films or fibers.

The modification of the alpha-amino acid polymers with the N-substituted-alpha-amino acid N-carboanhydrides can be carried out at temperatures ranging from room temperature to 150° C. or higher. It is preferred to carry out the modification reaction at temperatures in the range of 25 to 30° C. above and below the melting point of the N-substituted-alpha-amino acid N-carboanhydride involved. In most cases this will lie in the range of about 70 to about 130° C. It is convenient to carry out the modification reaction at the reflux temperature of the solvent if one is being used. Suitable solvents, which will dissolve both the N-substituted-alpha-amino acid N-carboanhydride and the alpha-amino acid polymer include for example, halogenated hydrocarbons, e. g., chloroform, carbon tetrachloride, tetrachloroethane, chlorobenzene, bromobenzene; aromatic hydrocarbons, e. g., benzene, toluene, the xylenes.

The concentration of the N-substituted-alpha-amino acid N-carboanhydride in the modifying solution is governed largely by the solubility of the N-carboanhydride involved in the solvent being used. The concentration of the amino acid polymer in the reaction mixture is similarly governed. However, it is usually preferable to operate at no higher concentration than that at which the resulting solution is fluid enough to insure complete mixing of the amino acid polymer and the N-carboanhydride.

The process of the present invention yields modified polymers of high molecular weight and high inherent viscosity which are orientable and film- and fiber-forming but which, in contrast with the unmodified polymer, have acceptable water sensitivity and dyeability.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for improving the water-absorptive capacity and the dyeability from aqueous solutions of synthetic, high molecular weight, orientable, film- and fiber-forming, linear leucine polymers which comprises bringing such a polymer in contact, in an inert solvent, with the N-carboanhydride of sarcosine and retaining the reactants in contact at 50–150° C. for a time, between 4 and 24 hours, until 5–25% of sarcosine units, based on the final product, is introduced into the polymer.

2. Process for improving the water-absorptive capacity and dyeability from aqueous solutions of synthetic, high molecular weight, orientable, film- and fiber-forming, linear leucine polymers which comprises bringing such a polymer in contact, in an inert solvent at 50–150° C. with the N-carboanhydride of an N-alkyl glycine, RNH—CH$_2$—COOH, wherein R is an alkyl group of one to four carbons, and maintaining the reactants in contact for a time, between 4 and 24 hours, until 5–25% of N-alkyl glycine units, —NRCH$_2$CO—, based on the final product, is introduced into the polymer.

3. Process for improving the water-absorptive capacity and dyeability from aqueous solutions of synthetic, high molecular weight, orientable, film- and fiber-forming, linear polymers of an alpha-primary amino alkanoic acid which comprises bringing such a polymer in contact, in an inert solvent, with the N-carboanhydride of sarcosine and retaining the reactants in contact at 50–150° C. for a time, between 4 and 24 hours, until 5–25% of sarcosine units, based on the final product, is introduced into the polymer.

4. Process for improving the water-absorptive capacity and dyeability from aqueous solutions of synthetic, high molecular weight, orientable, film- and fiber-forming, linear polymers of an alpha primary amino alkanoic acid which comprises bringing such a polymer in contact, in an inert solvent at 50–150° C. with the N-carboanhydride of an N-alkyl glycine,

RNH—CH$_2$—COOH wherein R is an alkyl group of one to four carbons, and maintaining the reactants in contact for a time, between 4 and 24 hours, until 5–25% of N-alkyl glycine units, —NRCH$_2$CO—, based on the final product, is introduced into the polymer.

5. Process for improving the water-absorptive capacity and dyeability from aqueous solutions of synthetic, high molecular weight, orientable, film- and fiber-forming, linear polymers of an alpha-primary mono-amino monocarboxylic acid which, apart from one amino and one carboxyl group, is saturated hydrocarbon which comprises bringing such a polymer in contact, in an inert solvent, with the N-carboanhydride of sarcosine and retaining the reactants in contact at 50–150° C. for a time, between 4 and 24 hours, until 5–25% of sarcosine units, based on the final product, is introduced into the polymer.

6. Process for improving the water-absorptive capacity and dyeability from aqueous solutions of synthetic, high molecular weight, orientable, film- and fiber-forming, linear polymers of an alpha-primary monoamino monocarboxylic acid which, apart from the one amino and the one carboxyl group, is saturated hydrocarbon, which comprises bringing such a polymer in contact, in an inert solvent at 50–150° C. with the N-carboanhydride of an N-alkyl glycine,

RNH—CH₂—COOH wherein R is an alkyl group of one to four carbons, and maintaining the reactants in contact for a time, between 4 and 24 hours, until 5–25% of N-alkyl glycine units, —NRCH₂CO—, based on the final product, is introduced into the polymer.

7. Process for improving the water-absorptive capacity and dyeability from aqueous solutions of synthetic, high molecular weight, orientable, film- and fiber-forming, linear alpha-primary monoamino monocarboxylic acid polymers, which polymers are, apart from the —NHCO— groups, saturated hydrocarbon, which comprises bringing such a polymer in contact, in an inert solvent at 50–150° C. with the N-carboanhydride of a non-aromatic alpha-amino acid,

R'NH—R''—COOH wherein R'' is a saturated hydrocarbon radical of one to six carbons and R' is a saturated hydrocarbon radical of one to seven carbons and maintaining the reactants in contact for a time, between 4 and 24 hours, until 5–25% of N-hydrocarbon-substituted aliphatic alpha-amino acid units, —NR'—R''—CO—, based on the final product, is introduced into the polymer.

8. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, saturated hydrocarbon, which comprises bringing such a polymer in contact, in an inert solvent at a temperature of 25–160° C. with the N-carboanhydride of a non-aromatic N-monosubstituted alpha-amino acid, R'NH—R''—COOH, wherein R'' is a saturated hydrocarbon radical of one to six carbons and R' is a hydrocarbon radical of one to seven carbons, free from aliphatic unsaturation, and maintaining the reactants in contact for a time, between 4 and 48 hours, until 1–50% of N-monosubstituted alpha-amino acid units, based on the final product, is introduced into the polymer.

9. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, saturated hydrocarbon, which comprises maintaining such a polymer in contact at 25–160° C. with the N-carboanhydride of an N-monosubstituted alpha-monoamino monocarboxylic acid,

R'NH—R''—COOH wherein R'' is a saturated hydrocarbon radical of one to six carbons and R' is a hydrocarbon radical of one to seven carbons, free from aliphatic unsaturation, until 1–50% of N-monosubstituted alpha-amino acid units, based on the final product, is introduced into the polymer.

10. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, saturated hydrocarbon, which comprises bringing such a polymer in contact at 25–160° C. with the N-carboanhydride of an alpha amino acid

R'NH—R''—COOH wherein R'' is a saturated hydrocarbon radical of one to six carbons and R' is a hydrocarbon radical of one to seven carbons, free from aliphatic unsaturation, and maintaining the reactants in contact for a time, between 15 minutes and 48 hours, until 1–50% of —NR'—R''—CO— units, based on the final product, is introduced into the polymer.

11. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, hydrocarbon free from aliphatic unsaturation, which comprises bringing such a polymer in contact, in an inert solvent at a temperature of 25–160° C. with the N-carboanhydride of an N-monosubstituted alpha-amino acid, R'NH—R''—COOH, wherein R'' is a saturated hydrocarbon radical of one to six carbons and R' is a hydrocarbon radical of one to seven carbons, free from aliphatic unsaturation, and maintaining the reactants in contact for a time, between 4 and 48 hours, until 1–50% of N-monosubstituted alpha-amino acid units, based on the final product, is introduced into the polymer.

12. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, hydrocarbon free from aliphatic unsaturation, which comprises maintaining such a polymer in contact at 25–160° C. with the N-carboanhydride of an N-monosubstituted alpha-amino acid,

R'NH—R''—COOH wherein R'' is a saturated hydrocarbon radical of one to six carbons and R' is a hydrocarbon radical of one to seven carbons, free from aliphatic unsaturation, until 1–50% of N-monosubstituted alpha-amino acid units, based on the final product, is introduced into the polymer.

13. Process for improving the water-absorptive capacity and dyeability from aqueous solutions of high molecular weight, orientable, film- and fiber-forming, linear alpha-primary monoamino monocarboxylic acid polymers, which polymers are, apart from the —NHCO— groups, hydrocarbon free from aliphatic unsaturation, which comprises bringing such a polymer in contact at 25–160° C. with the N-carboanhydride of an alpha-amino acid, A'NH—R''—COOH, wherein R'' is a saturated hydrocarbon radical of one to six carbons and R' is a hydrocarbon radical of one to seven carbons, free from aliphatic unsaturation, and maintaining the reactants in contact for a time, between 15 minutes and 48 hours, until 1–50% of —NR'—R''—CO— units, based on the final product, is introduced into the polymer.

ROBERT NEAL MacDONALD.

REFERENCES CITED

The following references are of record in the file of this patent:

UNITED STATES PATENTS

| Number | Name | Date |
|---|---|---|
| 2,327,162 | Baldwin et al. | Aug. 17, 1943 |

OTHER REFERENCES

Baldwin et al.: Journal Society of Dyers and Colorists, vol. 62, pp. 4 to 9, 1946.